(12) United States Patent
Lai et al.

(10) Patent No.: US 7,668,872 B2
(45) Date of Patent: Feb. 23, 2010

(54) DATA MANAGEMENT SYSTEMS AND METHODS FOR NETWORKS

(75) Inventors: Po-Chun Lai, Hsinchu County (TW); Shou-Wen Chen, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 368 days.

(21) Appl. No.: 11/357,693

(22) Filed: Feb. 17, 2006

(65) Prior Publication Data

US 2007/0198544 A1 Aug. 23, 2007

(51) Int. Cl.
*G06F 17/30* (2006.01)
(52) U.S. Cl. .................. 707/200; 707/104.1; 707/10
(58) Field of Classification Search .................. None
See application file for complete search history.

(56) References Cited

U.S. PATENT DOCUMENTS

| | | | |
|---|---|---|---|
| 7,089,583 B2 * | 8/2006 | Mehra et al. | 726/3 |
| 7,139,761 B2 * | 11/2006 | McKibben et al. | 707/10 |
| 7,254,588 B2 * | 8/2007 | Sung et al. | 707/104.1 |
| 2002/0198964 A1 * | 12/2002 | Fukazawa et al. | 709/219 |
| 2004/0078316 A1 * | 4/2004 | Clark et al. | 705/37 |

FOREIGN PATENT DOCUMENTS

CN 1201949 12/1998

OTHER PUBLICATIONS

CN Office Action mailed May 23, 2008.

* cited by examiner

*Primary Examiner*—Jean M Corrielus
*Assistant Examiner*—Loan T Nguyen
(74) *Attorney, Agent, or Firm*—Thomas, Kayden, Horstmeyer & Risley

(57) ABSTRACT

A data management method for a network. Whether a first record in a database is updated is automatically determined. Content of the first record is organized in a hierarchical structure. Which of a group of clients is affected by update of the first record is automatically determined. A data format corresponding to an affected client is automatically determined. A message is automatically generated by modifying the hierarchical structure according to the data format. The message comprising the result of modifying the hierarchical structure is automatically transmitted to the affected client.

14 Claims, 8 Drawing Sheets

B0 — L1: <?xml version="1.0" encoding ="UTF-8" standalone="yes"?>

B1:
- L2: <CI_CUST>
- L3: <CUST_CD>U033</CUST_CD>
- L4: <SERV_REGION_CD>U00</SERV_REGION_CD>

B2:
- L5: <CI_ADDR>
- L6: <ADDR_SEQ>991</ADDR_SEQ>
- L7: <ADDR_LINE1>3100 WEST WARREEN AVE.</ADDR_LINE1>
- L8: <ADDR_LINE2>M/S 515</ADDR_LINE2>
- L9: <ADDR_LINE3>FREMONT, CA 94538</ADDR_LINE3>
- L10: <CITY_NAME>FREMONT</ CITY_NAME >
- L11: <STATE_CD>CA</STATE_CD>
- L12: <ZIP_CD>94538</ZIP_CD>
- L13: <COUNTY>ALAMEDA</COUNTY>
- L14: <COUNTRY>US</COUNTRY>
- L15: </CI_ADDR>

B3:
- L16: <CI_CUST_SPRT_ROLE>
- L17: <CUST_CD>U033</CUST_CD>
- L18: <ROLE_LONG_NAME> ACCOUNT MANAGER</ROLE_LONG_NAME>
- L19: <ROLE_SHORT_NAME> AM</ROLE_SHORT_NAME>

B4:
- L20: <CI_SPRT_TEAM_MEMBER>
- L21: <CUST_CD>U033</CUST_CD>
- L22: <SPRT_TEAM_ROLE_SEQ>1</SPRT_TEAM_ROLE_SEQ>
- L23: <USER_ACCT_NAME>MZHANG</USER_ACCT_NAME>
- L24: <TEAM_MEMBER_EMAIL_ADDR>MZHANG@TTTT.com </TEAM_MEMBER_EMAIL_ADDR>
- L25: <SPRT_PRTY_ORDER>1</SPRT_PRTY_ORDER>
- L26: </CI_SPRT_TEAM_MEMBER>

- L27: <CI_SPRT_TEAM_MEMBER>
- L28: <CUST_CD>U033</CUST_CD>
- L29: <SPRT_TEAM_ROLE_SEQ>1</SPRT_TEAM_ROLE_SEQ>
- L30: <USER_ACCT_NAME>TGEORGE</USER_ACCT_NAME>
- L31: <TEAM_MEMBER_EMAIL_ADDR> TGEORGE@TTTT.com</TEAM_MEMBER_EMAIL_ADDR>
- L32: <SPRT_PRTY_ORDER>2</SPRT_PRTY_ORDER>

- L33: </CI_SPRT_TEAM_MEMBER>
- L34: </CI_CUST_SPRT_ROLE>
- L35: </CI_CUST>

FIG. 3

DATA MANAGEMENT SYSTEMS AND METHODS FOR NETWORKS

BACKGROUND

The invention relates to network communication, and in particular, to network data management.

The value chain concept described by Michael Porter in 1985 has been utilized as a powerful tool to analyze value-adding activities in an organization, such as a company. To maximize value creation while minimizing costs, the interrelated value-adding activities must collaborate well. FIG. 1 is a schematic diagram of value chains in a semiconductor foundry. Entities therein maintain different data and collaborate to form value chains.

For example, product data master (PDM) 192 communicates with manufacturing execution system (MES) 191 to maintain new product data. Customer data master (CDM) 194 maintains new customer data. Price quotation master (PQA) 196 generates price quotations based on product and customer data respectively stored on PDM 192 and CDM 194. Order manager (OM) 193 maintains order data associated with customer data. Order price checker (OPC) 195 calculates profit margins from order data and price quotations. Thus, data processed by respective entities has dependency (denoted by arrows therebetween in FIG. 1), bringing a synchronization issue.

Communication between the entities is typically implemented by periodically transmitting data snapshots from one entity to another in a batch mode. This is not only time consuming, but also detrimental to data integrity. Additionally, when an entity transmits a data snapshot, other entities receive and extract the content thereof according to the format in which the data snapshot is composed. If the format is changed, all of the other entities must change their extraction processes accordingly.

SUMMARY

Accordingly, data management systems and methods are provided.

An exemplary embodiment of a data management method for a network is provided. The method automatically determines whether a first record in a database is updated. Content of the first record is organized in a hierarchical structure. The method further determines automatically which of a group of clients is affected by the update of the first record. A data format corresponding to one affected client is automatically determined. A message is automatically generated by modifying the hierarchical structure according to the data format. The message comprising the result of modifying the hierarchical structure is automatically transmitted to the affected client.

An exemplary embodiment of a data management system comprises a primary database, a database manager, a workflow engine, an organizer, and a routing engine. The primary database stores a first record, content of which is organized in a hierarchical structure. The database manager automatically determines whether the content of the first record is updated. The workflow engine automatically determines which of a group of clients coupled to the primary database is affected by update of the first record. The organizer automatically determines a data format corresponding to an affected client and generates a message by modifying the hierarchical structure according to the data format. The routing engine automatically transmits the message comprising the result of modifying the hierarchical structure to the affected client.

DESCRIPTION OF THE DRAWINGS

The invention can be more fully understood by reading the subsequent detailed description and examples with references made to the accompanying drawings, wherein:

FIG. 3 is an exemplary embodiment of a customer data record.

DETAILED DESCRIPTION

Data management systems and methods for a network which may be implemented in a foundry, such as a semiconductor foundry, are provided.

Figure 1:
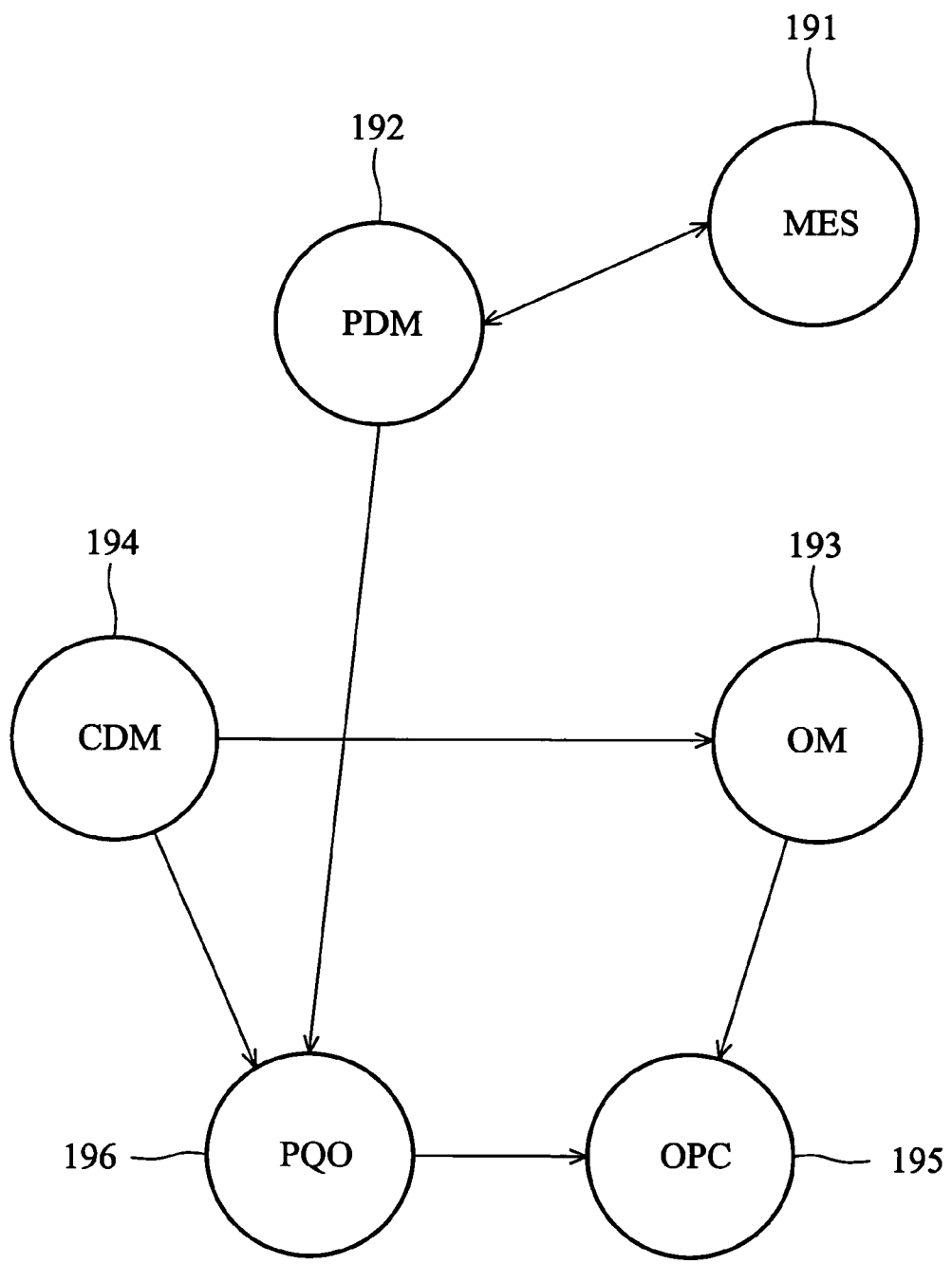
FIG. 1 is a schematic diagram of value chains in a semiconductor foundry.
Figure 2:
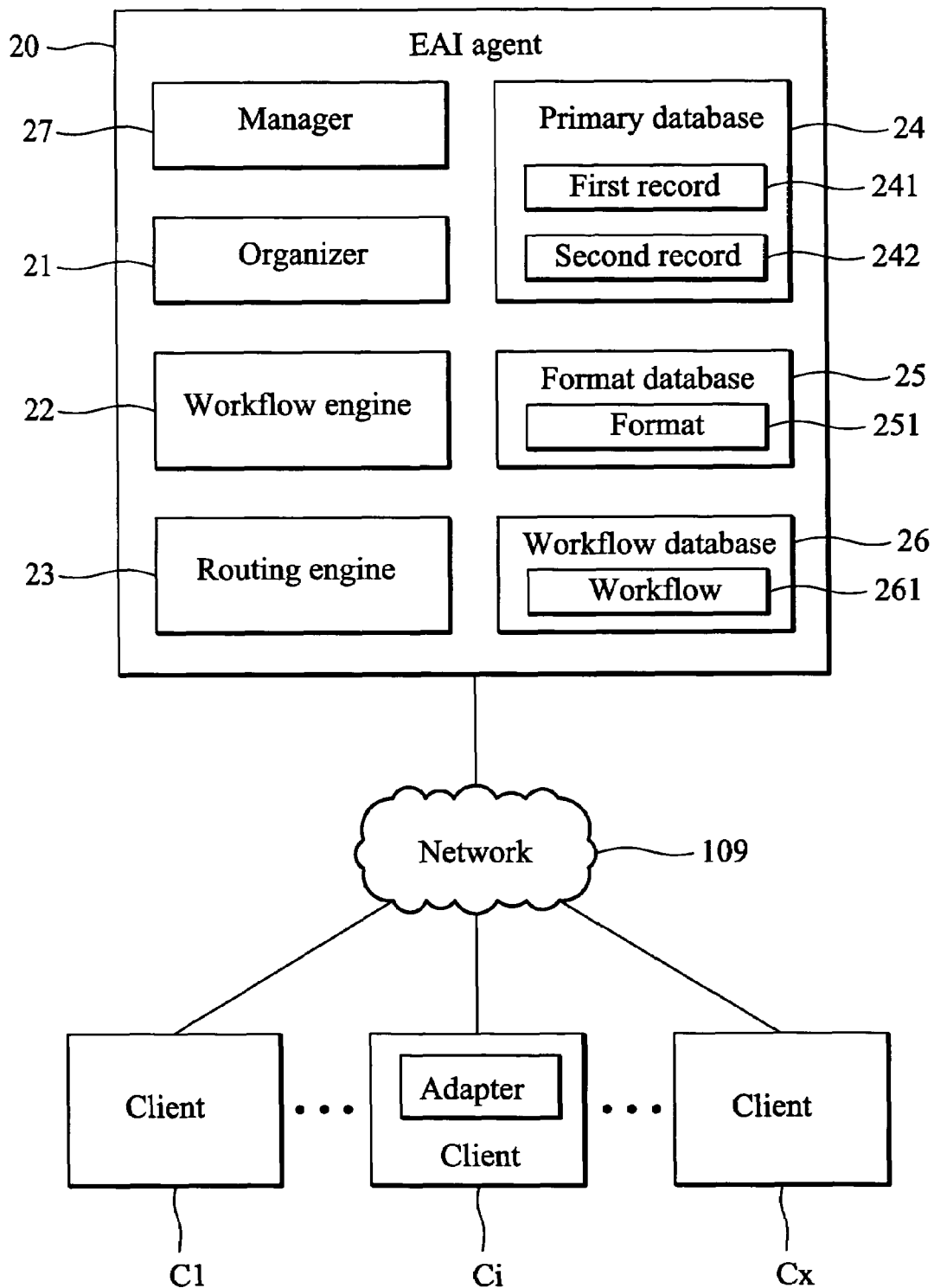
FIG. 2 is a block diagram of an exemplary embodiment of a data management system.

An exemplary embodiment of data management system 240 shown in FIG. 2 comprises an enterprise application integration (EAI) agent 20 and a group of clients C1-Cx coupled thereto through network 109. EAI agent 20 and clients C1-Cx may comprise entities involved in workflows of a foundry, such as MES 191, PDM 192, OM 193, CDM 194, OPC 195, and PQO 196. Each EAI agent 20 and clients C1-Cx may comprise a computer capable of processing data. Data involved in the workflows are classified into categories, such as customer data, order data, price and quotations, and product data, each of which is stored on a respective centralized data repository, such as primary database 24 in EAI agent 20. For example, primary database 24 serves as the only access point storing new customer data of the foundry. Thus, other entities of the foundry do not receive new customer data in advance of primary database 24. Manager 20 manages primary database 24. As will be appreciated by persons skilled in the art, the EAI agent 20, and the various components that make it up, is embodied in a computer program for execution by a computer, and is stored on a computer readable medium.

According to the data categories, the content therein may be complicated. That is, concepts expressed in a data category may have complex relationships. With reference to FIG. 3, an exemplary embodiment of a first record 241 of customer data stored in primary database 24 is provided. First record 241 conforms to a self-describing format, wherein the content of first record 241 is classified into objects, each of which is delimited by a couple of tags (such as <CI_CUST> and </CI_CUST> in lines L2 and L35) annotating characteristics of the delimited object. Thus, records of primary database 24 conform to the self-describing format. Descendent objects (such as objects B1-B4) enclosed by tags of an ascendant object (such as object B0) belong to the ascendant object, thus forming a hierarchical structure. Description of records of primary database 24 may conform to extensible markup language (XML) but is not limited thereto.

Each client comprises an adapter (such as adapter 31 of client Ci) for processing data received from EAI agent 20. EAI agent 20 and clients C1-Cx may have their data in different formats. For example, a client processes customer data in table format; another client processes customer data organized in a diminished hierarchical structure; and still another client processes customer data denoted by exotic tags. Format database 25 stores and associates data formats (such as format 251) with clients C1-Cx.

Routes of data propagation among entities of a foundry depend on workflows thereof. As data repository manager, EAI agent 20 comprises workflow database 26 storing workflows (such as workflow 261) and correlations of workflows, clients C1-Cx, and tagged data in primary database 24. Note that configuration of data management system 240 is not limited to FIG. 2.

Figure 4:
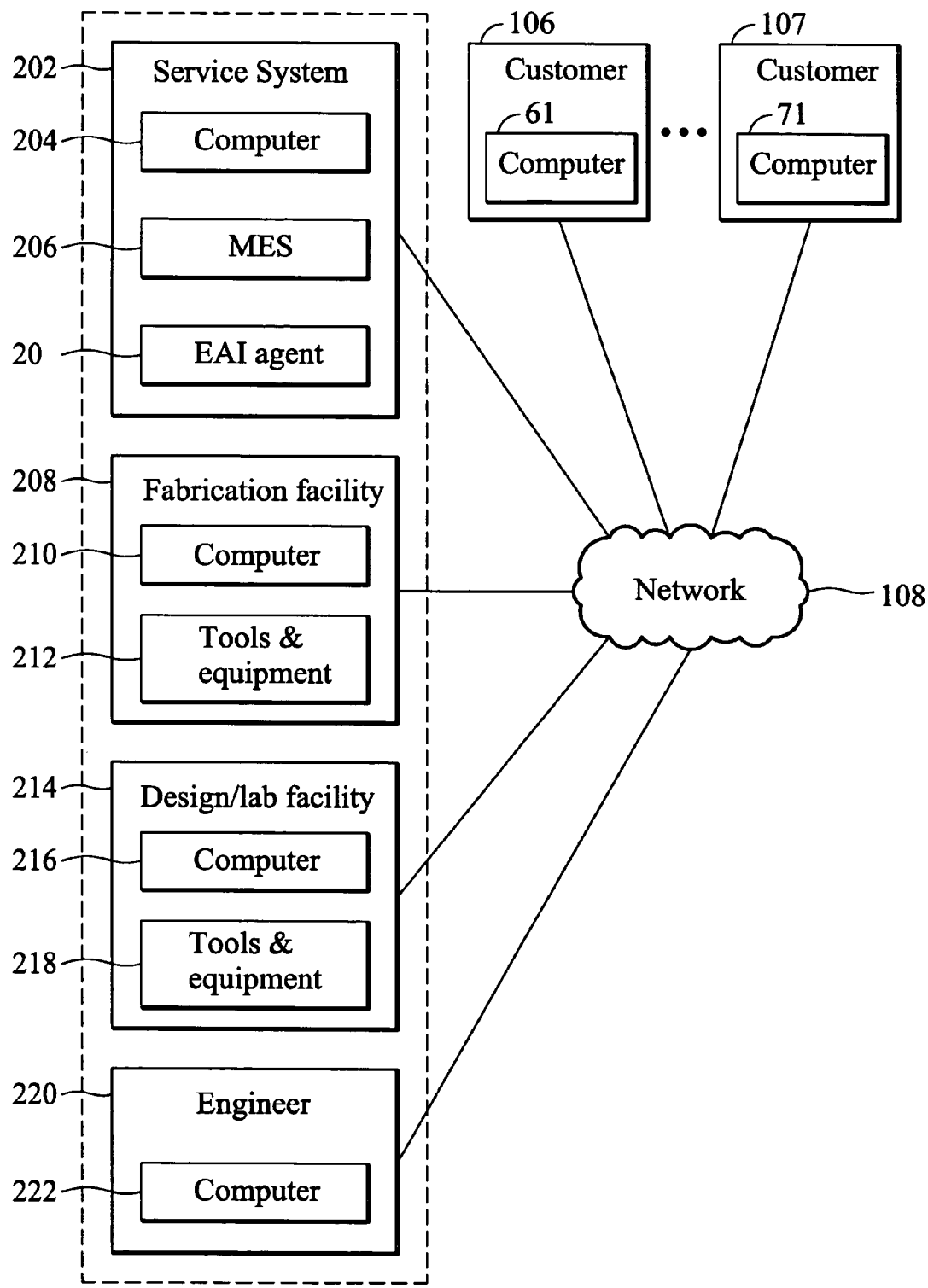
FIG. 4 is a block diagram of an exemplary embodiment of a semiconductor manufacturing environment.

With reference to FIG. 4, semiconductor foundry 102 implements data management system 240. EAI agent 20 may be one entity (such as a computer or a software module) in semiconductor manufacturing environment 100, and clients C1-Cx may be other entities therein.

In semiconductor manufacturing environment 100, semiconductor foundry 102 comprises a plurality of entities, each of which includes a computer coupled to others and customers (such as customers 106 and 107) through network 108. Network 108 may be the Internet or an intranet implementing network protocols, such as Internet Protocol (IP) and transmission control protocol (TCP). Customers 106-107 may be IC design companies or other entities for IC processing. Each computer included in the entities comprises a network interface.

Service system 202 is an interface between customers (such as customers 106 and 107) and semiconductor foundry 102, transferring information about semiconductor manufacturing. Service system 202 includes computer 204 facilitating such communication and manufacturing execution system (MES) 206.

MES 206, coupled to other systems and entities of semiconductor foundry 102, performs various operations to facilitate IC manufacture. For example, MES 206 can receive various real-time information, organize and store the information in a centralized database, manage work orders, workstations, manufacturing processes and relevant documents, and track inventory.

Fabrication facility 208 fabricates ICs. Accordingly, fabrication facility 208 includes fabrication tools and equipment 212. For example, tools and equipment 212 may comprise an ion implantation tool, a chemical vapor deposition tool, a thermal oxidation tool, a sputtering tool, various optical imaging systems, and software controlling the various tools and equipment. Fabrication facility 208 also includes computer 210.

Design/lab facility 214 conducts IC design and testing. Design/lab facility 214 may comprise design/test tools and equipment 218. The tools and equipment 218 comprise one or more software applications and hardware systems. Design/lab facility 214 also comprises computer 216.

Engineer 220 collaborates on IC manufacturing with other entities, such service system 202 and other engineers. For example, engineer 220 can collaborate with other engineers and the design/lab facility 214 on design and testing of ICs, monitor fabrication processes at the fabrication facility 208, and receive information regarding runs and yield. Engineer 220 also communicates directly with customers, using computer 222 to perform various operations.

Note that configuration of the entities of semiconductor foundry 102 is not limited to FIG. 4. They can be centralized in a single location or distributed. Some entities may be integrated into other entities.

Figure 5:
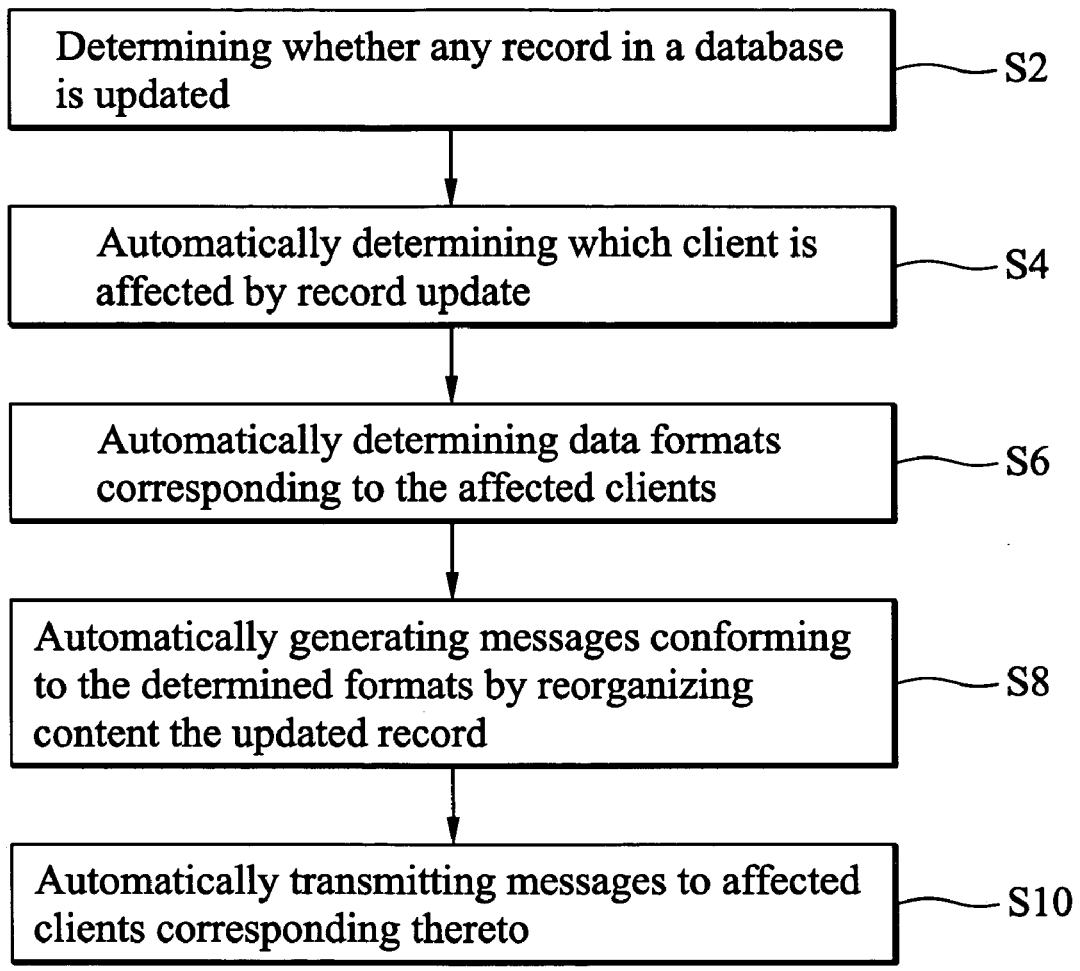
FIG. 5 is a flowchart of an exemplary embodiment of a data management method.

With reference to FIG. 5, manager 27 detects primary database 24 and automatically determines whether any record in a database is updated (step S2). Workflow engine 22 automatically determines which of the clients C1-Cx is affected by record update (step S4). For example, when manager 27 determines first record 241 in a database is updated, workflow engine 22 automatically locates clients affected by update of first record 241 utilizing correlation therebetween stored on workflow database 26. Since customer data is denoted by tags, workflow database 26 may associate customer data and clients at the tag level. For example, workflow engine 22 automatically locates workflow 261 affected by update of first record 241 and determines that client Ci is the first stage of workflow 261.

When affected clients are determined, organizer 21 automatically determines data formats corresponding to the affected clients (step S6). For example, organizer 21 locates data formats (such as format 251) from format database 25 according to the affected clients (such as client Ci), automatically generates messages conforming to the determined formats by reorganizing content of first record 241 (step S8).

Figure 6:
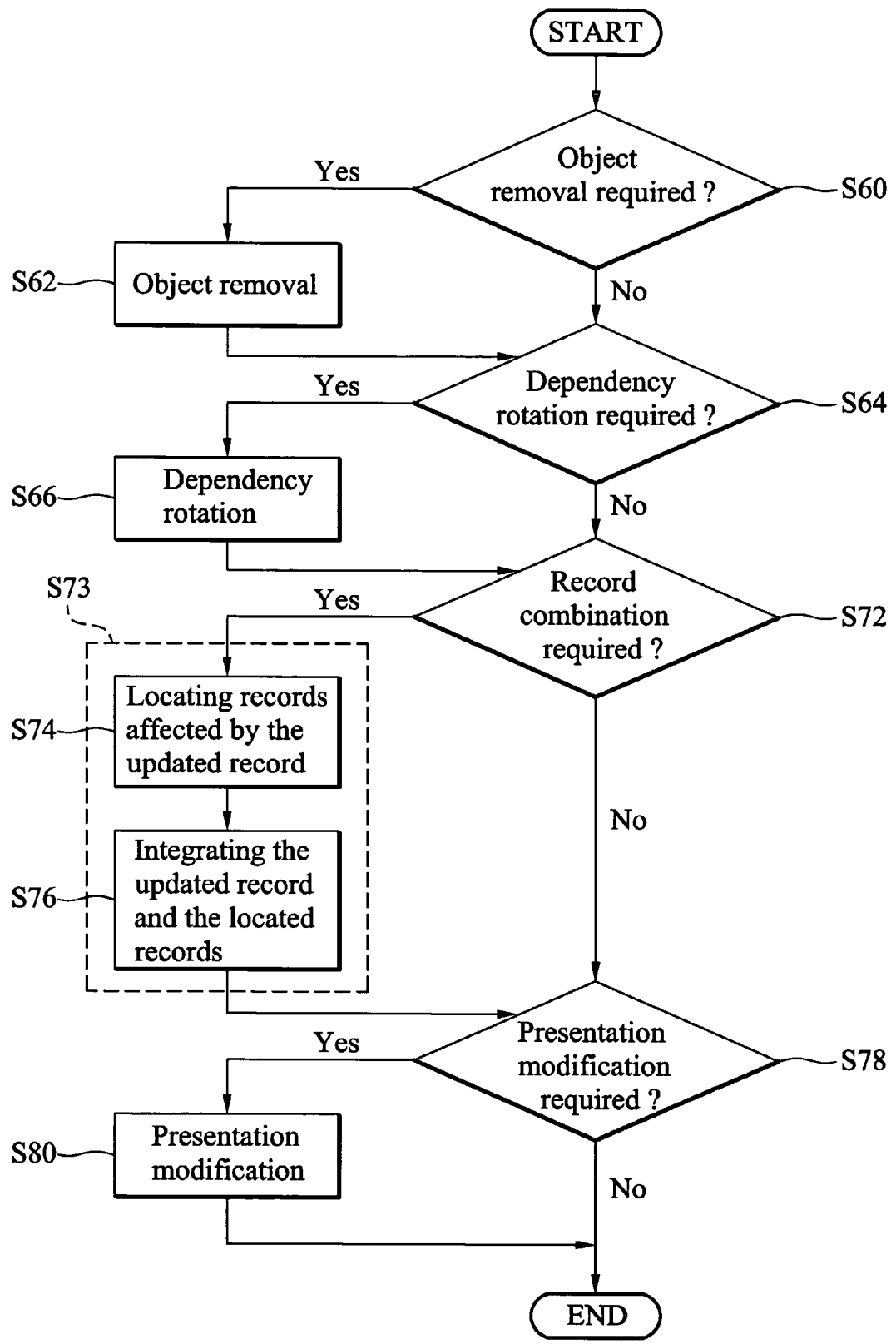
FIG. 6 is a flowchart of an exemplary embodiment of reorganization operations.

Organizer 21 may duplicate a copy of first record 241 and reorganize content of the copy by modifying the hierarchical structure therein according to the data formats (such as format 251). FIG. 6 shows an exemplary embodiment of reorganization.

Figure 7:
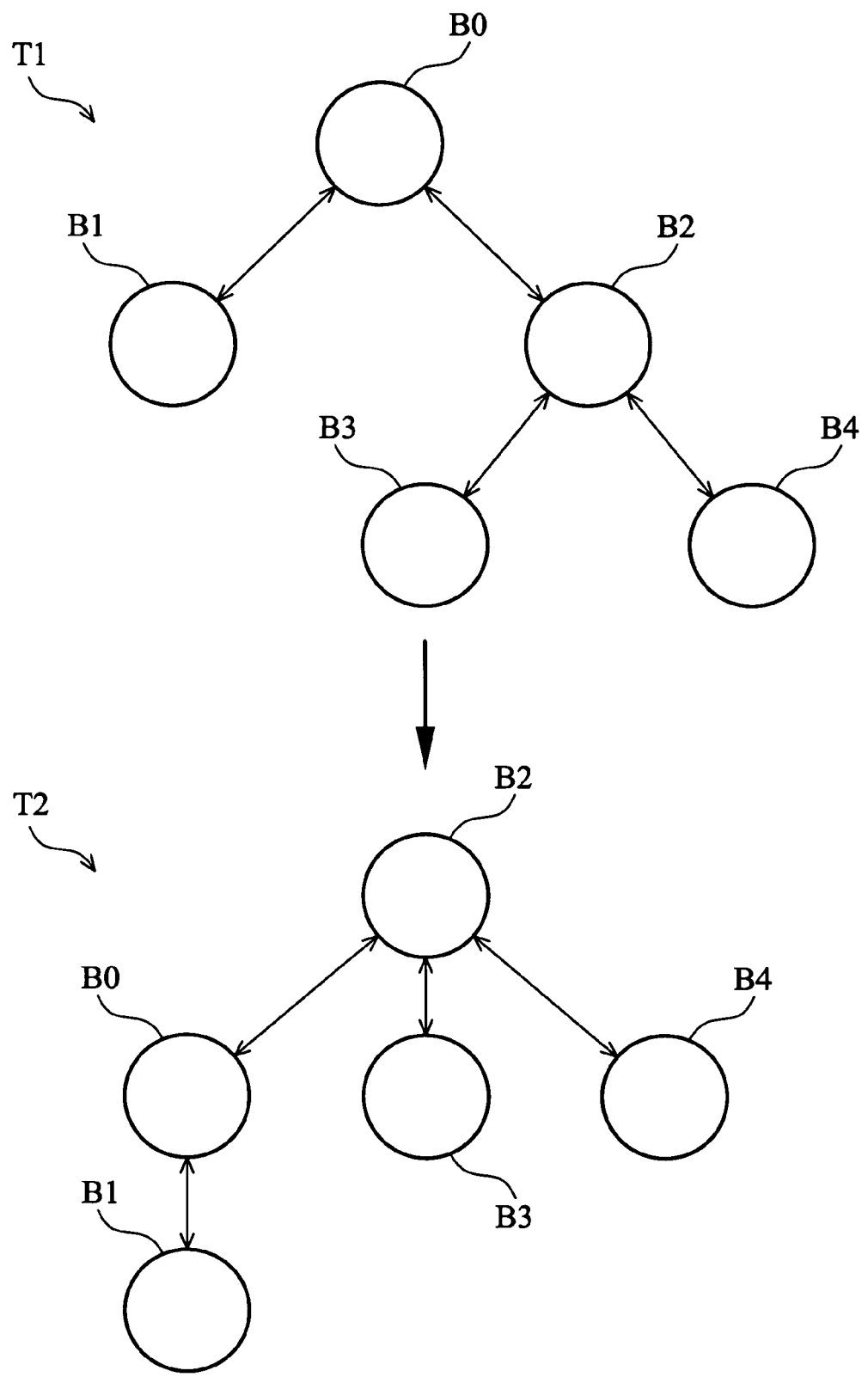
FIG. 7 is a schematic diagram of an exemplary embodiment of dependency rotation.
Figure 8:
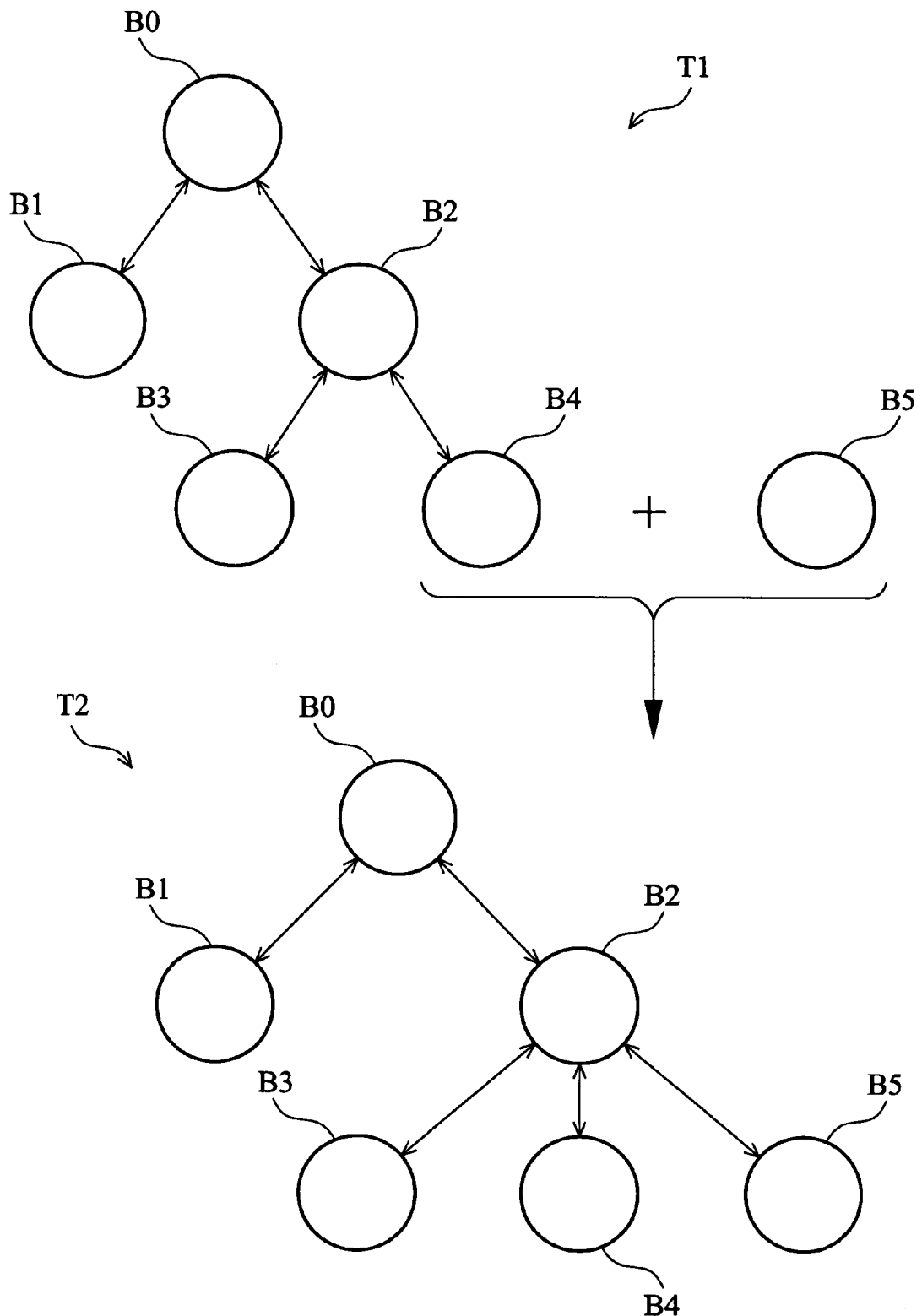
FIG. 8 is a schematic diagram of an exemplary embodiment of record integration.

With a notion of a data format to which a message is to be converted, organizer 21 determines if object removal (step S60), dependency rotation (step S64), record combination (step S72), or presentation conversion (step S78) are required to generate the message and respectively implements required operations on the copy accordingly (steps S62, S66, S73, and S80). In an object removal operation (step S62), at least one object (such as object B1) is removed from the hierarchical structure of the copy. With reference to FIG. 7, the hierarchical structure is represented by a tree T1. In a dependency rotation operation (step S66), tree T1 is converted to T2 wherein object B2 becomes an ascendant object of object B0. Thus, organizer 21 converts dependency between a descendent object and an ascendant object thereof. In record combination operation (step S73), organizer 21 locates second record 242 affected by the update of first record 241 (step S74) and integrates first record 241 and second record 242 (step S76). With reference to FIG. 8, for example, object B5 is labeled by tags <CI_SPRT_TEAM_MEMBER> and </CI_SPRT_TEAM_MEMBER> the same as tags of objects B3 and B4. Organizer 21 integrates an updated portion of the first record (such as T1) and a portion (such as object B5) of the second record affected by the update into a record (such as T3) according to tags thereof. 9. The generated messages may conform to extensible markup language (XML) or not.

In a presentation conversion operation (step S80), the result of the previous operations is converted to a data presentation format, such as table formats, other than its original format (such as XML). Presentation conversion comprises tag translation operation in which tags in the copy are translated according to the located data format (such as format 251).

Messages generated by organizer 21 comprise the result of the implemented operations. Routing engine 23 associates each message conforming to a data format with at least one affected client corresponding to the data format. Routing engine 23 automatically transmits each message to the corresponding affected client thereof (step S10). Clients C1-Cx respectively receives and stores the messages. For example, adapter 31 processes a received message according to data format 251.

Although the data management system and method are implemented in a semiconductor foundry, they can be implemented in other foundries or organizations.

Consequently, the data management system provides a centralized data repository and an EAI agent managing data thereof. When detecting a data update, the EAI agent automatically determines affected data and data processing entities, reorganizes the affected data to generate messages, and transmits the message to the affected entities.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data management method for a network, comprising:
   automatically determining whether a first record in a database is updated, wherein content of the first record is organized in a hierarchical structure;
   automatically determining which of a group of clients is affected by update of the first record;
   automatically determining a data format corresponding to one affected client;
   automatically generating a message by modifying the hierarchical structure according to the data format; and
   automatically transmitting the message comprising the result of modifying the hierarchical structure to the affected client quotation master, an order manager, an order price checker, and a manufacturing execution system,
   wherein the system enterprise application integration agent is implemented in a semiconductor foundry,
   wherein the content of the first record is classified into objects comprising the hierarchical structure, in which a descendent object belongs to an ascendant object, and at least one object is removed from the hierarchical structure after modification thereof, and
   wherein the hierarchical structure conforms to a self-describing format wherein each of the objects is delimited by a pair of tags annotating characteristics of the delimited object.

2. The method as claimed in claim 1, wherein customer data of the semiconductor foundry and updates thereto are centralized into the database.

3. The method as claimed in claim 2, wherein the group of clients comprises at least one of a product data manager, a customer data manager, a price.

4. The method as claimed in claim 1, wherein modification of the hierarchical structure comprises translating the tags.

5. The method as claimed in claim 4, wherein the first record conforms to extensible markup language (XML).

6. The method as claimed in claim 1, further comprising: locating an second record affected by the update of the first record; and integrating an updated portion of the first record and a portion of the second record affected by the update into the message according to tags thereof.

7. The method as claimed in claim 1, wherein modification of the hierarchical structure comprises converting dependency between the descendent object and the ascendant object.

8. A computer readable medium readable by a computer and containing a computer program for execution by a computer, the computer program defining an enterprise application integration agent, comprising:
   a primary database storing a first record, content of which is organized in a hierarchical structure;
   a database manager automatically determining whether the content of the first record is updated;
   a workflow engine automatically determining which of a group of clients coupled to the primary database is affected by update of the first record;
   an organizer automatically determining a data format corresponding to one affected client and generating a message by modifying the hierarchical structure according to the data format; and
   a routing engine automatically transmitting the message comprising the result of modifying the hierarchical structure to the affected client,
   wherein the system enterprise application integration agent is implemented in a semiconductor foundry,
   wherein the content of the first record is classified into objects comprising the hierarchical structure, in which a descendent object belongs to an ascendant object, and at least one object is removed from the hierarchical structure after modification thereof, and
   wherein the hierarchical structure conforms to a self-describing format wherein each of the objects is delimited by a pair of tags annotating characteristics of the delimited object.

9. The computer readable medium as claimed in claim 8, wherein customer data of the semiconductor foundry and updates thereto are centralized into the database.

10. The computer readable medium as claimed in claim 8, wherein the hierarchical structure conforms to a self-describing format wherein each of the objects is delimited by a pair of tags annotating characteristics of the delimited object.

11. The computer readable medium as claimed in claim 10, wherein the organizer translates the tags.

12. The computer readable medium as claimed in claim 11, wherein the first record conforms to extensible markup language (XML).

13. The computer readable medium as claimed in claim 10, the organizer locates an second record affected by the update of the first record from the primary database and integrates an updated portion of the first record and a portion of the second record affected by the update into the message according to tags thereof.

14. The computer readable medium as claimed in claim 10, wherein the organizer converts dependency between the descendent object and the ascendant object.

* * * * *